United States Patent [19]
Kennedy

[11] 3,966,994
[45] June 29, 1976

[54] DRY STABLE INSTANT BEVERAGE MIX

[75] Inventor: Timothy James Kennedy, Springfield Township, Hamilton County, Ohio

[73] Assignee: The Procter & Gamble Company, Cincinnati, Ohio

[22] Filed: July 17, 1974

[21] Appl. No.: 489,291

[52] U.S. Cl. .............................. 426/590; 426/591
[51] Int. Cl.² ........................................... A23L 2/00
[58] Field of Search ........... 426/191, 190, 365, 366, 426/464, 470, 471, 477, 380, 464, 470, 471, 477, 590, 591

[56] References Cited
UNITED STATES PATENTS

| | | |
|---|---|---|
| 2,851,359 | 9/1958 | Diller .................................. 426/191 |
| 3,241,977 | 3/1966 | Mitchell et al. ...................... 426/191 |
| 3,510,311 | 5/1970 | Swaine et al. ........................ 426/191 |
| 3,667,962 | 6/1972 | Fretzberg et al. .................... 426/191 |

FOREIGN PATENTS OR APPLICATIONS

| | | |
|---|---|---|
| 607,606 | 10/1960 | Canada .............................. 426/191 |

Primary Examiner—Raymond N. Jones
Attorney, Agent, or Firm—Lawrence J Klich

[57] ABSTRACT

A dry beverage mix and process for preparing same which contains phosphoric acid in a dry, stable form. The dry beverage mixes of the present invention rapidly dissolve in an aqueous solution which may be carbonated to form colas, root beers, sarsaparillas or any other beverage which contains phosphoric acid as a flavoring ingredient and acidulent.

33 Claims, No Drawings

DRY STABLE INSTANT BEVERAGE MIX

BACKGROUND OF THE INVENTION

This invention relates to food products, and more particularly to aqueous carbonated beverages prepared by adding a dry mix to water and carbonating the resulting solution.

The market for carbonated beverages has increased at a dramatic rate, and today is a multi-billion dollar industry. Up to the present, this market has been served almost exclusively by beverages which are pre-carbonated to the proper level for immediate consumption and then packaged in bottles or cans. While carbonation of beverages at the point of consumption, such as soda fountains, has been practiced for years, preparation of point-of-consumption individual servings of carbonated beverages in the home has not thus far been greeted with wide acceptance.

One method of making carbonated beverages in the home involves the dilution of flavor syrups to the proper concentration and carbonating the resulting solution, such as would be done at a soda fountain. However, such an approach is overly burdensome for the volume of carbonated beverages consumed in a home, involves the procurement, and correct dilution of, the flavor syrups, and hence has not met with wide popularity. Another method of making carbonated beverages in the home involves the use of dry mixes containing flavors and sugars along with a gas generation system. This type of drink has also not gained wide consumer acceptance since consumers find that the flavor of carbonated beverages produced from mixes does not equal, in both intensity and quality, the flavor of pre-carbonated and bottled beverages.

In order to obtain a beverage having a flavor which consumers regard as "typical" for that type of a drink, it is necessary to incorporate all flavor components, including flavor components present in only small amounts, into the flavor base or concentrate. It has been found that even a relatively small difference in beverage flavor from that considered typical for a particular beverage will not be accepted by consumers.

The flavor of carbonated beverages is developed in part through proper acidulation which points up, or complements, the associated flavor. One of the acids commonly employed for flavor development is phosphoric acid which has found wide use in the more heavy leaf, root, nut, or herbal flavors. Some of the more common types of carbonated beverages utilizing phosphoric acid are colas, root beers, and sarsaparillas.

For beverage flavors which contain phosphoric acid, serious problems are presented when attempts are made to dehydrate the beverage flavor base to form a dry mix. This is due to the extreme hygroscopicity and reactivity of phosphoric acid in dry form. If a dry beverage mix is made containing dehydrated phosphoric acid and sugar, the acid is so extremely hygroscopic that it dehydrates the sugar leaving a black, charred, tarry substance after only a short storage time. Even if the beverage sugar content is separated from the acid, the acid will react with other flavor components to destroy the typical flavor of the rehydrated beverage. Substitutions of other readily dehydratable acids for the phosphoric acid may be made, but this results in flavor changes in beverages, such as colas, which depend upon their phosphoric acid content as an essential component of their flavor.

It is also known that part of the unique cola flavor is due to the interaction between the phosphoric acid and other flavor components during an aging period of the liquid flavor base. If the phosphoric acid is not mixed with the other flavor components but dehydrated separately in the manufacture of a dry beverage mix, this interaction during aging cannot occur and the full cola flavor will not develop.

Thus, in order to prepare dry instant mixes for flavored beverages which contain phosphoric acid as a flavor component and acidulant, it is necessary to include the phosphoric acid in the liquid flavor base, but also ultimately provide it in a dry, non-reactive form so as to insure stability of the dry mix during handling and storage before use.

Another disadvantage of dry beverage mixes is the relatively slow dissolution rate of the sugars (usually sucrose) in the mix. In beverage mixes developed so far, dissolution is obtained only upon stirring and after a period of at least several minutes. As can be appreciated by all who labor, this extra preparation time and effort is extremely disadvantageous to the tired, thirsty consumer who turns to a carbonated beverage as a readily accessible and convenient item of cold, liquid refreshment.

It is, therefore, an object of the present invention to form a dry beverage mix utilizing phosphoric acid present in a relatively non-hygroscopic and stable form as a flavoring ingredient and acidulant.

It is also an object of the present invention to form such a dry beverage mix by dehydrating a flavor base which has been aged with all flavor components, including phosphoric acid, contained therein.

It is a further object of the present invention to form a dry beverage mix having an extremely rapid dissolution rate upon contact with water and which requires only a minimum amount of agitation for dissolution in an aqueous solution to form a beverage in a short period of time.

Still another object of the present invention is to furnish the consumer with a convenient method for preparing carbonated beverages equal in level and quality of flavor to pre-carbonated, bottled beverages.

These and other objects of the present invention will become readily apparent to those skilled in the art from a reading of the disclosure and appended claims which follow.

SUMMARY OF THE INVENTION

The present invention provides a dry, stable beverage mix for beverage flavor bases containing phosphoric acid as a flavoring component and acidulent. This is accomplished by incorporating a mono-alkali orthophosphate into the beverage flavor base in an amount at least stoichiometrically equal to the amount of phosphoric acid present in the flavor base. The flavor base is combined with the sugar content typical of such beverages to form a slurry, dried and ground into suitable particle sizes. Upon subsequent contact with water, the particles rapidly dissolve with a minimum of agitation to form a beverage having a full-bodied flavor typical of that beverage, including the flavor component contributed by phosphoric acid, without any undesirable off-flavors.

DETAILED DESCRIPTION OF THE INVENTION

The flavor concentrate, commonly called the flavor base, is the beverage component containing all flavorings, with the exception of sugar (as used herein, the term sugar is intended to be generic to cover not only sucrose, the sugar most commonly used in the production of carbonated beverages, but also includes dextrose [D-glucose], fructose [levulose], liquid sugar [either sucrose or an invert-sucrose blend], invert sugar [50—50 blend of dextrose and fructose], lactose or maltose). A carbonated beverage is obtained by diluting the flavor base to the proper strength for a particular beverage, adding the proper sugar content for that beverage and carbonating this aqueous solution. Formulations for various flavor bases are well known to those skilled in the art and may readily be obtained from published sources. For example, Merory, *Food Flavorings*, The Avi Publishing Company, (1960), lists various flavor base formulations in Chapter 17, entitled "Syrup and Soda Flavorings"; also, in Jacobs, M.B., *Manufacture and Analysis of Carbonated Beverages*, Chemical Publishing Company (1959), formulations for many fruit and non-fruit flavor bases are given. Complete flavor bases are also commercially available in standardized concentrations for ease in dilution to the proper concentration for the final beverage. These are commonly known as "2-ounce" or "4-ounce" flavor bases depending upon the amount of the base which must be added to a gallon of simple syrup which is then diluted with water to the final beverage strength. (As those skilled in the art will appreciate, a simple syrup is a solution of sugar in water, usually in a standard concentration). Commercially obtained flavor bases are typically about 50% solvent, usually water or ethanol, with the flavor components typical for a particular flavor dissolved therein.

In accordance with the present invention, a monoalkali orthophosphate is added to a beverage flavor base containing phosphoric acid. The addition of the mono-alkali orthophosphate permits the dehydration of the phosphoric acid component of the flavor base in a stable, non-hygroscopic form and thus permits the flavor base to be formed into a dry instant beverage mix suitable for subsequent dissolution in water to yield a beverage having a fully developed flavor typical for that beverage. The amount of the mono-alkali orthophosphate to be added to the flavor base is determined by the phosphoric acid content in the flavor base. If the flavor base has been formulated from a known recipe, the amount of phosphoric acid will be known; or, if the flavor base has been commercially obtained, the amount of phosphoric acid in it may readily be analytically determined by conventional means. In the practice of the present invention, it is important that the mono-alkali orthophosphate be added in an amount at least equal to the molar amount of phosphoric acid in the flavor base. The maximum amount of mono-alkali orthophosphate that can be added to the flavor base is determined only by the appearance of an undesirable off-flavor resulting from the added phosphate. It has been found that the most common phosphates may be added to the flavor base in an amount of up to 20%, and preferably 10%, in excess over the molar amounts of phosphoric acid contained in the flavor base without the appearance of any noticeable off-flavors. In the practice of the present invention, monosodium phosphate is the most preferred phosphate, however, equally acceptable dry mixes are obtained with the use of monopotassium phosphate and monoammonium phosphate.

Although it is not critical to the practice of the present invention, it is preferred that the mono-alkali orthophosphates be added to the flavor base after the addition of the phosphoric acid content. This will allow the phosphoric acid and other flavor components in the flavor base to have sufficient time in which to interact during the aging process and develop the full flavor of that particular beverage.

Applicant is uncertain of the exact reasons accounting for the addition of the mono-alkali phosphates causing the phosphoric acid to be readily dried into a relatively stable, non-hygroscopic form, but theorize that a complex is formed between the phosphoric acid in the flavor base and the mono-alkali orthophosphate, which complex is relatively stable and non-hygroscopic. However, applicant does not wish to be bound by any single theory in the practice of his invention, in that no such phosphoric acid complex has yet been analytically identified in a dry flavor base formed in accordance with the present invention and the known prior literature in the area is vague and contradictory. For example, in an article by Alain Norbert, entitled "Contribution to Chemistry of Sodium and Potassium Orthophosphates" appearing in *Revue de Chimie Minérale*, tome III, 1966, pp. 1–59, the author states that a "hemi" alkali phosphate, such as hemisodium phosphate, is obtained from an admixture of equimolar solutions of the mono-alkali phosphate, such as monosodium phosphate and phosphoric acid. This would lead to the conclusion that the hemi-alkali phosphate salt is formed in situ upon the addition of the mono-alkali phosphate to the flavor base containing phosphoric acid. On the other hand, in Diller, U.S. Pat. No. 2,851,359, issued Sept. 9, 1958, and entitled "Effervescive Powders for Producing Protracted Ebullition" the patentee states that the hemi-alkali phosphates are not addition compounds of the mono-alkali phosphate and phosphoric acid, but are formed as a complex of metaphosphoric acid, the mono-alkali phosphate, and one water of crystallization. Since it is well known that metaphosphoric acid is only very slowly dissolvable in water, the formation of a hemi-alkali phosphate in a dry flavor base mix would thus be undesirable. Further, in Miller, U.S. Pat. No. 2,715,059, issued Aug. 9, 1955, and entitled "Phosphatizing Composition", it is stated that the addition of phosphoric acid to a mono-alkali phosphate (specifically, monosodium phosphate) produces a wet acid product which is difficult to handle and corrosive to equipment used in shipping the compound. However, in spite of these negative publications, applicant has discovered that the addition of a mono-alkali phosphate to a flavor base containing phosphoric acid results in a conversion of the phosphoric acid into a dehydratable, non-reactive form, but which form is also rapidly dissolvable in water so as to permit the production of a superior dry beverage mix from the flavor base.

If a commercially available beverage flavor base is used for the preparation of the dry beverage mix of the present invention, various substances may optionally be added to the flavor base in processing it in accordance with the present invention to provide a dry beverage mix. The only criterion that limits the possible inclusion of any optional ingredient is that it must be acceptable for use in an edible food product. Other than this restriction, only the appearance of an undesirable off-taste or off-color for a particular beverage will place a practical limitation on the addition of any desired material. As those skilled in the art will appreciate, the variety of different materials which may be added is extremely broad indeed. For example, the present invention is concerned with a dry beverage mix which will be dissolved in water at the point of consumption. In doing this, the consumer will most likely use tap water which is slightly alkaline due to the mineral salts dissolved therein. Thus, to neutralize this additional alkalinity, additional acid may be needed to achieve the same intensity of acidulation as that achieved when distilled or de-ionized water is used as a beverage base. Any common food acid, such as citric, malic, or phosphoric may be used for this purpose. Of course, if phosphoric acid is used, the amount of the mono-alkali orthophosphate needed to combine with the acid will correspondingly increase. Other materials which may be used include various additional flavoring ingredients which may be added to the commercial flavor base to modify its flavor, accentuate any especially preferred flavor notes, or replace any flavor notes which may be volatilized and lost during processing into a dry mix. Some of the more common flavoring ingredients which can be added to a cola beverage include, for example, extract of coca leaves, neroli oil, lime oil, lemon oil, orange oil, nutmeg oil, vanilla extract or cassia oil. Other flavoring materials for colas or any other desired beverage may be found in published formulation recipes for the particular beverage flavor desired. Other types of materials, such as food colorings, for example, U.S. Certified Food Colors or caramel coloring; stimulants, for example, caffeine; artificial sweeteners, for example, saccharin; bodying agents, for example, sorbitol or sodium carboxymethylcellulose; foaming agents, for example, licorice root extract or saponin-bearing extract of soaproot; or preservatives, for example, sodium benzoate, propylene glycol or ascorbic acid may advantageously be added to the flavor base to achieve the respective desired results. Alternatively, if the flavor base is formulated specifically for processing into a dry beverage mix in accordance with the present invention, standard flavor base formulations may be directly adapted for use by the addition of any desired optional ingredient not set forth in the standard formulation.

The flavor base of the present invention may then be dried by conventional means known to the art, such as by spray drying or evaporative drying. However, a preferred method of drying the flavor base yields rapidly dissolving particles, which begin to dissolve immediately upon contact with water, and merely the agitation imparted to the water by the effervescence of carbonation is sufficient to provide a uniform concentration of flavor in the resulting beverage.

In the practice of this preferred method of drying, it has been found desirable to add a solid carrier to the flavor base in order to obtain stable crystals upon drying. This carrier may be any of a variety of conventional absorptive solid materials which are suitable for use in edible products, so long as the carrier does not impart any undesirable off-flavors to the beverage in the concentration used.

Since carbonated beverages are typically made up of an approximately 10% sugar solution, sugar is the most preferred carrier as there is a readily available source of sugar for addition to the flavor base. If a "low-calorie" carbonated beverage mix is desired, other common food substance carriers, such as sodium carboxymethylcellulose, gum karaya, gum arabic or dextrin can be substituted for all, or any portion, of the sugar. In carrying out the present invention, it has been found necessary to add the carrier in an amount of at least four times the amount of flavoring ingredients in the flavor base. In fact, in the present invention, it is highly preferred to incorporate all of the sugar normally present in a particular beverage as the carrier for the flavor base. This assures that the final dried mix will have a uniform concentration of sugar and flavor ingredients without any localized deficiency or buildup of one or the other of the two components of the dry mix. Also, since the flavor particles of the present invention dissolve more quickly in water than do conventional granular sugar crystals, incorporating all of the beverage sugar into the flavor particles permits it to be present in the dry beverage mix in a more soluble form. As those skilled in the art will appreciate, the proper amount of sugar needed for a given amount of flavor base of any particular beverage is readily determined.

In forming the dry beverage flavor particles, the proper flavor base is blended with sugar, or other carrier, to form a thick, homogenous slurry. In this regard, it is often necessary to add a small amount of water for workability and to achieve thorough admixing of the ingredients. Only so much water as is necessary for these purposes need to be added since any added water is subsequently removed during the drying operation and excess water only contributes to the inefficiency of the process. It has been found that any type of conventional mixing means may be used for this purpose, as long as a thorough mixing is achieved. It is preferred, however, that the temperature of the slurry be kept below about 100°F during admixture to avoid any loss of volatiles or heat degradation of flavor components. With this consideration in mind, it is thus recommended that low-shear mixing means be employed, since these will impart less energy to the mixture, and correspondingly, less heat.

The admixture of flavor base, carrier (preferably the beverage sugar) and any optional ingredients is then dried to a substantial dryness using conventional vacuum or freeze drying techniques to produce a dry beverage mix. Substantial dryness is that state where the matter has the appearance of a free-flowing, dry-to-the-touch solid. This will typically mean drying to a final moisture content of less than about 3%, and preferably, less than about 1%. In keeping with the present invention, it is important that the slurry be dried by vacuum drying, or equivalent techniques which causes the drying material to foam, so as to form a beverage mix which is rapidly dissolvable in water requiring only a minimum amount of agitation. Vacuum drying techniques are known to those skilled in the art and will not be detailed herein for purposes of brevity. It has been found that best results are obtained if the slurry is dried within a period of about 8, and preferably about 3 hours and that the temperature of the slurry is not raised above 100°F, and preferably above 50°F, during the drying process. In the practice of the present invention, it has been found that conventional freeze drying techniques are equivalent to the vacuum drying techniques in the results obtained and may thus be advantageously employed. Freeze drying basically involves freezing to temperatures of about −10°F to about −40°F and removing the water by sublimation as the frozen slurry is gradually warmed under vacuum conditions. Again, any of the conventional freeze-drying techniques known to those skilled in the art are suitable for the practice of the present invention.

The dried product resulting from the dehydration step is ground by conventional size reduction techniques so as to make it more readily dissolvable when added to water and to enhance the appearance of the final product. Depending upon the fineness to which the particles are ground, they may either be screened to obtain groups of approximately uniform particle size, or the dried mix may be ground to a fine particle size and agglomerated using conventional agglomeration techniques.

After grinding to a suitable particle size, the dry stable beverage mix particles are packaged in suitable aliquot portions for subsequent dissolution in a predetermined amount of water to obtain flavorful beverage ready for carbonation and consumption. The dry beverage particles of the present invention may be advantageously employed with a variety of carbonation systems to provide suitably carbonated, flavorful beverages. For instance, the dry beverage particles as disclosed herein can be added to pre-carbonated water, or, the dry beverage particles can be combined with an economical point-of-consumption carbonation system and this combination then added to tap water to provide a convenient, carbonated beverage. Examples of suitable sources of pre-carbonated water are the use of bottled pre-carbonated water, commonly known as "club soda" or the use of pressure carbonators which utilize $CO_2$-charged cylinders to carbonate water as it is dispensed, such as is done at a soda fountain. Examples of point-of-consumption systems which utilize regular tap water for the beverage include the use of a "chemical couple" such as those disclosed in Mitchell et al., U.S. Pat. No. 3,241,977, issued Mar. 22, 1966, or Hovey, U.S. Pat. No. 3,492,671, issued Jan. 27, 1970; or the use of $CO_2$-loaded zeolite molecular sieves, such as that disclosed in pending U.S. patent application, Ser. No. 302,149, filed Oct. 30, 1972 and incorporated herein by reference in its entirety.

The latter-named carbonation system, i.e., the use of $CO_2$-loaded zeolite molecular sieves, is especially preferred in the practice of the present invention. Molecular sieves of this type are crystalline aluminosilicate materials of the following general formula:

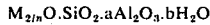

$$M_{2/n}O.SiO_2.aAl_2O_3.bH_2O$$

in the salt form, where $n$ is the valence of a metal cation M, M ordinarily is Na or K but may be other cations substituted by exchange, $a$ is the number of moles of alumina, and $b$ is the number of moles of water of hydration. Due to the crystalline nature of such materials, the diameters of the surface cavities and of the internal pores are substantially constant and are of molecular magnitude. For this reason, the crystalline aluminosilicates have found wide use in the separation of materials according to molecular size or configuration, hence the name molecular sieves. Upon removal of at least some of the water of hydration by heating, the crystalline aluminosilicates become highly porous and are characterized by a series of surface cavities and internal pores which form an interconnecting network of passageways within the crystal. Such dehydrated molecular sieves are often referred to as "activated", meaning that they are ready to selectively adsorb molecules of a given size. Carbon dioxide is strongly adsorbed, or "loaded", on such sieves, but can subsequently be displaced by the stronger and preferential absorption of water. Hence, the release of absorbed $CO_2$ from molecular sieves upon contact with an aqueous potable liquid provides a convenient and economical point-of-consumption beverage carbonation system. By employing molecular sieves loaded with carbon dioxide to the extent of at least 5% by weight of the molecular sieves and by carbonating a beverage at temperatures of from about 35°F to about 70°F (the temperature of the beverage) and atmospheric pressures, suitably carbonated beverages can be obtained in about 1–10 minutes. As might be expected, increasing the quantity of molecular sieves employed for a given amount of beverage solution increases the amount of carbon dioxide released. Although the optimum amount of molecular sieves employed will vary with the characteristics of the particular sieve type employed and the beverage solution to be carbonated, the preferred quantity of molecular sieves ranges from about 0.5 gram to about 4 grams of molecular sieves (before loading) per fluid ounce of beverage to be carbonated.

It is important that the dry flavor particles of the present invention be packaged in a moisture-proof container, in that the particles are hygroscopic in nature and that the particle physical structure collapses when wetted. Also, exposure to moisture would activate any phosphoric acid present in the flavor mix which would lead to degradation of the sugar and flavor components in the mix. A convenient method for insuring that these flavor particles are not degraded by exposure to moisture during storage periods is to have them packaged in the presence of a desiccant. The $CO_2$-loaded molecular sieves disclosed in the above-mentioned pending U.S. patent application is a suitable desiccant for such purposes. Thus, the presence of such $CO_2$-loaded zeolite molecular sieves in combination with the dry flavor mix has multiple advantages in that they provide protection of the flavor particles during storage, provide a convenient and sufficient carbonation system during use, and the effervescent action resulting from the molecular sieves immersed in water is sufficient to provide adequate agitation for the dissolution of the dry flavor particles of the instant invention.

The following Examples serve to illustrate various embodiments of the invention and are not intended to limit the invention in any way.

EXAMPLE I

To 3.75 parts of a commercially available 2-ounce cola flavor base, 100 parts of bulk granular sugar, 0.52 parts of monosodium phosphate and 7.5 parts of water were added. The amount of monosodium phosphate was based on the analytically determined amount of phosphoric acid in the flavor base. The ingredients were thoroughly blended into a homogeneous slurry in a Hobart paddle mixer. This slurry was then vacuum dried at 50°F under 1 inch Hg absolute. The particles were fully dried to a 1.0% moisture level after 8 hours and were subsequently ground so that 100% of the particles passed through a 7-mesh screen but 60% of the particles were retained on a 12-mesh screen. 25 grams of the dry flavor particles were then placed in an 8-ounce glass, along with an operable amount of $CO_2$-loaded zeolite molecular sieves, these being prepared following the teachings of pending U.S. patent application, Ser. Number 302,149, filed Oct. 30, 1972. Tap water at a temperature of 60°F and ice cubes were added to the glass and after 30 seconds, 90% of the flavor particles had completely dissolved, as measured by a refractometer, with the only agitation provided by the effervescence of the molecular sieves, and after 1 minute, a fully carbonated, cold, flavorful cola beverage was produced.

Another sample of equal amounts of the same 2-ounce commercially available cola flavor base, bulk granular sugar and water was prepared and thoroughly admixed. Without further treatment, the flavor base-sugar mixture was placed in an 8-ounce glass with an operable amount of $CO_2$-loaded molecular sieves and tap water and ice cubes added to produce a flavorful carbonated cola beverage. In a comparison between the first beverage, that is, the beverage prepared in accordance with the present invention, with the second beverage revealed that both cola beverages had the same intensity of acidulation and had the same cola flavor with no off-taste detected resulting from the monosodium phosphate in the first beverage.

Essentially equivalent results are obtained when an excess of monosodium phosphate (20% excess over the analytically determined amount of phosphoric acid) is added to the flavor base, which is then further processed as set forth above.

An equally acceptable beverage mix is produced when a commercially available root beer flavor base is substituted for the cola flavor base and treated in accordance with the present invention to provide dry beverage flavor particles.

An equally acceptable carbonated beverage results when a dry cola flavor mix, processed as outlined above, is added to a cold cup of commercially available soda water.

EXAMPLE II

The following ingredients were thoroughly blended for about 5 minutes in a Hobart paddle mixer to obtain a homogeneous slurry:

| Ingredient | Parts |
| --- | --- |
| Bulk granulated sugar (sucrose) | 100 |
| Caffeine | 0.15 |
| 2-ounce commercial cola flavor base | 3.6 |
| Monosodium orthophosphate | 0.63 |
| 85% phosphoric acid | 0.14 |
| Water | 7.5 |

The amount of monosodium phosphate added was an equimolar amount of the sum of the added phosphoric acid and the analytically determined amount of phosphoric acid in the cola base. After admixture, the slurry temperature was reduced to −10°F and dehydrated, the water being removed by conventional freeze drying techniques. This drying step took 24 hours. The particles were then ground so that 100% of the particles passed through a 7-mesh screen but that 60% of the particles were retained upon a 12-mesh screen. 25 grams of the resulting dry flavor beverage mix and an operable amount of aluminosilicate molecular sieves, loaded with $CO_2$ in accordance with the teachings of pending U.S. patent application, Ser. No. 302,149, filed Oct. 30, 1972, were placed in an 8-ounce glass. Tap water at a temperature of 60°F and ice cubes were added to make an 8-ounce beverage serving. The molecular sieves immediately began to effervesce and 90% of the flavor and sugar particles were fully dissolved within 30 seconds, as measured by a refractometer, and all flavor and sugar particles were completely dissolved within one minute. The only agitation was provided by the effervescence of the aqueous solution being carbonated by the molecular sieves. After the 1 minute mixing time, a flavorful, fully carbonated cola beverage resulted which appeared to be equal in carbonation and intensity of acid taste as cola beverages obtained from commercially available precarbonated bottled colas.

Essentially equivalent results were obtained when monosodium phosphate, in a 10% excess over the molar amount of the total phosphoric acid content, was added to the flavor base and further processed as set forth above.

Essentially equivalent results are obtained when the dried flavor base is finely ground and the fine particles agglomerated following the teachings of U.S. Pat. No. 3,615,669, issued Oct. 26, 1971.

Thus, it is apparent that there has been provided, in accordance with the present invention, a dry stable instant beverage mix that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A substantially dry composition for providing flavorful beverages upon the addition of water consisting essentially of: a beverage flavor base containing phosphoric acid as a flavor component and acidulent; and a monoalkali orthophosphate in an amount at least equimolar to the phosphoric acid content of said flavor base;, said composition having been prepared by drying an admixture of water, said flavor base and said phosphate.

2. The composition of claim 1 wherein the monoalkali orthophosphate is selected from the group consisting of monoammonium phosphate, monopotassium phosphate, and monosodium phosphate.

3. The composition of claim 2 wherein the monoalkali orthophosphate is monosodium phosphate.

4. The composition of claim 1 wherein the beverage flavor base is a cola base.

5. The composition of claim 1 wherein the beverage flavor base is a root beer base.

6. The composition of claim 1 wherein said composition has a solid crystalline sugar carrier.

7. The composition of claim 6 wherein said solid carrier is sucrose.

8. The composition of claim 1 wherein the composition has a moisture content of less than about 3%.

9. The composition of claim 8 wherein the composition has a moisture content of less than about 1%.

10. The composition of claim 9 wherein the composition has a moisture content of about 0.1%.

11. The composition of claim 1 wherein the amount of mono-alkali orthophosphate is from about equimolar to the phosphoric acid content to about 20% excess over the molar phosphoric acid content of said flavor base.

12. The composition of claim 11 wherein the amount of mono-alkali orthophosphate is from about equimolar to the phosphoric acid content to about a 10% excess over the molar phosphoric acid content of said flavor base.

13. A process for preparing a substantially dry beverage flavor base containing phosphoric acid as a flavor component and acidulent, which comprises: preparing a slurry by admixing a mono-alkali orthophosphate with a flavor base in an amount at least equimolar to the phosphoric acid content of said flavor base, and water; and dehydrating said slurry to a moisture content of less than about 3%.

14. The process of claim 13 wherein the mono-alkali orthophosphate is selected from the group consisting of monoammonium phosphate, monopotassium phosphate and monosodium phosphate.

15. The process of claim 14 wherein the mono-alkali orthophosphate is monosodium phosphate.

16. The process of claim 13 wherein the beverage flavor base is a cola base.

17. The process of claim 13 wherein the beverage flavor base is a root beer base.

18. The process of claim 13 wherein a solid carrier is admixed with said flavor mix before dehydration in an amount of at least four times the total amount of flavor components in said flavor mix.

19. The process of claim 18 wherein the solid carrier is sugar.

20. The process of claim 18 wherein said dehydration is effected by vacuum drying said admixture.

21. The process of claim 18 wherein said dehydration is effected by freeze drying said admixture.

22. The process of claim 13 wherein the amount of mono-alkali orthophosphate admixed with said flavor base is from about equimolar to the phosphoric acid content to about a 20% excess over the molar phosphoric acid content of said flavor base.

23. The process of claim 22 wherein the amount of mono-alkali orthophosphate admixed with said flavor base is from about equimolar to the phosphoric acid content to about a 10% excess over the molar phosphoric acid content of said flavor base.

24. The process of claim 13 wherein the flavor base is dehydrated to a moisture content of less than about 1%.

25. The process of claim 24 wherein the flavor base is dehydrated to a moisture content of about 0.1%.

26. A substantially dry composition for providing flavorful carbonated beverages comprising; a beverage flavor base containing phosphoric acid as a flavor component and acidulent; a mono-alkali orthophosphate in an amount at least equimolar to the phosphoric acid content of said flavor base; said composition having been prepared by drying an admixture of water, said flavor base and said phosphate to a moisture content of less than about 3%; in combination with an effective amount of carbon dioxide-loaded crystalline aluminosilicate zeolite molecular sieves.

27. The composition of claim 26 wherein the mono-alkali orthophosphate is selected from the group consisting of mono-ammonium phosphate, monopotassium phosphate, and monosodium phosphate.

28. The composition of claim 27 wherein the mono-alkali orthophosphate is monosodium phosphate.

29. The composition of claim 26 wherein the beverage flavor base is a cola base.

30. The composition of claim 26 wherein said composition has a solid crystalline sugar carrier.

31. The composition of claim 26 wherein the composition has a moisture content of less than about 1%.

32. The composition of claim 26 wherein the crystalline aluminosilicate zeolite molecular sieves are loaded with carbon dioxide in an amount of at least 5% by weight of the sieves.

33. The composition of claim 32 wherein the carbon dioxide-loaded molecular sieves are present in an amount of from about 0.5 grams to about 4.0 grams per ounce of beverage to be carbonated.

* * * * *